United States Patent Office 2,740,288
Patented Apr. 3, 1956

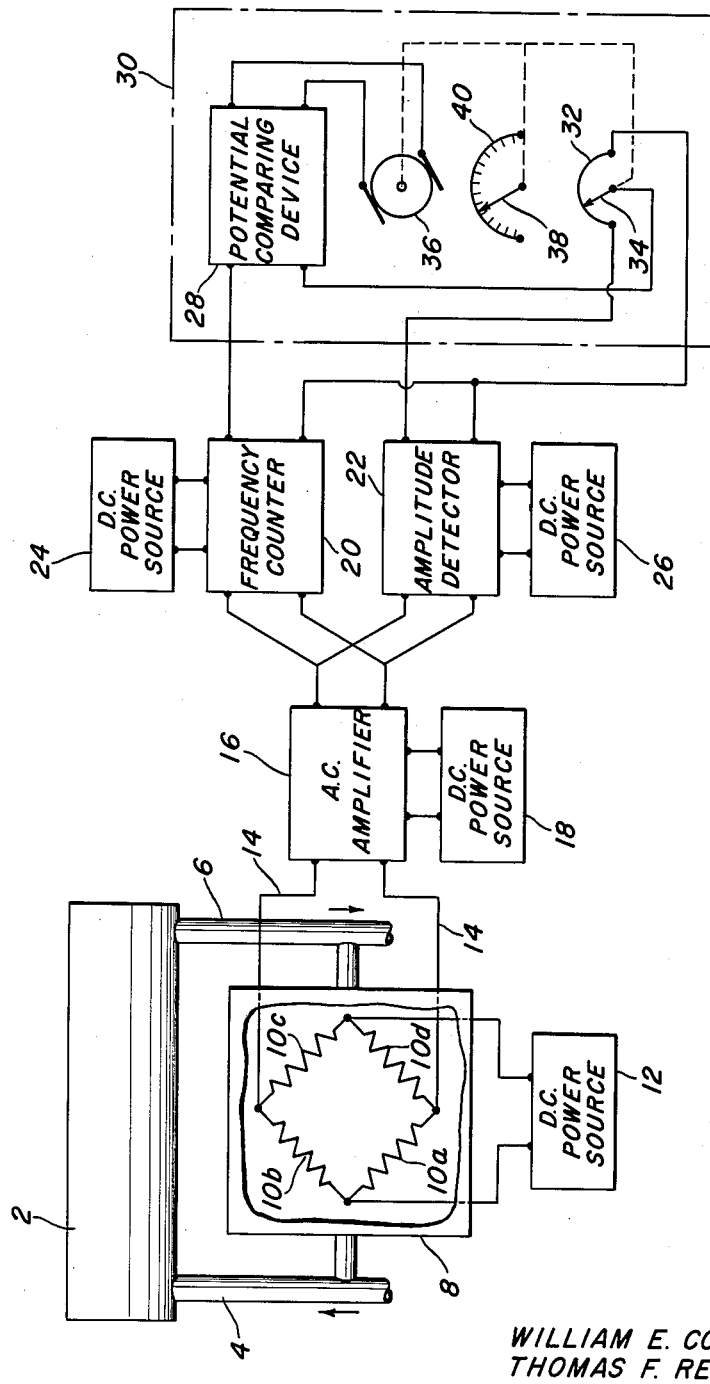
INVENTORS:
WILLIAM E. COLEMAN and
THOMAS F. REED,
BY: Donald G. Dalton
their Attorney.

2,740,288

APPARATUS FOR DETERMINING THE RATIO BETWEEN FREQUENCY AND AMPLITUDE OF PRESSURE VARIATIONS

William E. Coleman and Thomas F. Reed, Pittsburgh, Pa., assignors to United States Steel Corporation, a corporation of New Jersey Application February 5, 1954, Serial No. 408,562

3 Claims. (Cl. 73—38)

This invention relates to apparatus for determining the ratio between frequency and amplitude of pressure variations, especially in conjunction with pressure variations which occur in the chamber used in fluidized-bed processes. In such processes a gas is passed through finely divided solids in a chamber to bring about a chemical or physical change in the solid or gas and the uniformity of contact between the gas and solid particles is extremely important. Experiments have indicated that the ratio between frequency and amplitude of pressure variations in the chamber is a good measure of the uniformity of fluidization. Existing methods of measuring this ratio are quite expensive and time-consuming. One method used is described in an article by Shuster and Kisliak, published in the September 1952 issue of Chemical Engineering Progress, pages 455 to 458. As described therein, the fluctuations are first recorded and the record analyzed to determine the ratio. By the time the ratio is determined the process has proceeded to such a degree that changes cannot be made in time to do any good.

It is therefore an object of our invention to provide apparatus for determining rapidly the ratio between the frequency and amplitude of pressure variations.

This and other objects will be more apparent after referring to the following specification and attached drawings, in which:

The single figure is a schematic view of our device as installed in a fluidized-bed process.

Referring more particularly to the drawings, the reference numeral 2 indicates the chamber used in a fluidized-bed process. Gas enters the bottom of the chamber through an inlet 4, passes upwardly through the bed of solids and then out through an outlet 6. A mechanical-electrical transducer 8 is connected between the inlet 4 and outlet 6. The transducer may be of any type which will produce a voltage proportional to the pressure applied thereto. Various types of such transducers are on the market, the particular transducer disclosed utilizing four strain gages 10a, 10b, 10c and 10d connected in a bridge circuit and electrically energized from a D. C. power source 12. A fluctuating direct current voltage proportional to the applied pressure is obtained across output leads 14. The leads 14 are connected to an A. C. amplifier 16 which is supplied with voltage from a D. C. power source 18. The amplifier 16 separates the fluctuating signal from the steady signal and amplifies the fluctuating signal. If the fluctuating signal is of sufficient value that it need not be amplified, other means such as a condenser may be used to separate the fluctuating signal from the steady signal. The output of the amplifier 16 is connected to a frequency counter 20 and amplitude detector 22 connected in parallel. The frequency counter 20 and amplitude detector 22 are supplied with power from D. C. power sources 24 and 26, respectively. The frequency counter 20 produces a direct current voltage proportional to the frequency of the pressure variations and the amplitude detector 22 produces a direct current voltage proportional to the amplitude of the pressure variations. A polarity-sensitive potential comparing device 28 is connected in circuit with the output of the frequency counter 20 and the amplitude detector 22 for comparing the outputs thereof. The polarity sensitive potential comparing device may be a contact making galvanometer and may be part of a standard self-balancing potentiometer 30. A voltage divider such as a slide wire 32 is connected in said circuit and is provided with a movable arm 34. As shown, the frequency counter 20 has one output lead connected to the potential comparing device 28 and the other lead connected to one side of the slide wire 32. One lead of the amplitude detector 22 is connected to one side of the slide wire 32 and the other lead to the other side. The movable arm 34 is electrically connected to the potential comparing device 28. The output of potential comparing device 28 is connected to a reversible motor 36 which is mechanically connected to the arm 34. The motor 36 is also mechanically connected to the arm 38 of a dial 40 which is calibrated to indicate the ratio between the frequency and amplitude of the pressure variations.

The operation of the device is as follows: Since the transducer 8 is connected across the inlet 4 and outlet 6 the pressure will be applied thereto in essentially the same manner as it is being applied through the chamber 2. In the manner described above, voltage proportional to the frequency of the pressure variations will be delivered by the frequency counter 20 and voltage proportional to the amplitude of the pressure variations will be delivered by the amplitude detector 22. The circuits are so calibrated that the position of the arm 34 and corresponding arm 38 will indicate a relative value that is a true proportional ratio of the frequency to the amplitude. If the output of the frequency counter 20 applied to the potential comparing means 28 is equal to that portion of the voltage from the amplitude detector 22 applied to the potential comparing means 28, there will be no voltage output from the potential comparing means 28 and the motor 36 will remain stationary. If there is a difference between the two voltages applied to the potential comparing means 28, there will be an output voltage from the potential comparing means 28 of such value and polarity that it will cause the motor 36 to rotate in the necessary direction to move the arm 34 until a point is reached on the slide wire 32 where the voltage proportional to frequency is balanced out. This operation is continuous so that the ratio is known at all times. Instead of an indicating instrument a recording instrument may be used. If desired, the indication obtained may be used to control the flow of gas through the chamber 2.

While one embodiment of our invention has been shown and described it will be apparent that other adaptations and modifications may be made without departing from the scope of the following claims.

We claim:

1. Apparatus for determining the uniformity of fluidization in a chamber containing a finely divided solid and a gas passing therethrough which comprises a pressure transducer connected across the chamber for obtaining a voltage proportional to the pressure applied thereto, said transducer producing a steady signal proportional to the basic pressure of the gas and a fluctuating signal proportional to the change in pressure in said chamber, means connected to said transducer for separating the fluctuating signals from the steady signal, a frequency counter connected to said means for obtaining a voltage proportional to the frequency of the pressure variations, an amplitude detector connected in parallel with said frequency counter for obtaining a voltage proportional to the amplitude of the pressure variations, and a polarity sensitive potential comparing device connected in circuit with the outputs of said frequency counter and amplitude detector for comparing the outputs thereof.

2. Apparatus for determining the uniformity of fluidization in a chamber containing a finely divided solid and a gas passing therethrough which comprises a pressure transducer connected across the chamber for obtaining a voltage proportional to the pressure applied thereto, said transducer producing a steady signal proportional to the basic pressure of the gas and a fluctuating signal proportional to the change in pressure in said chamber, means connected to said transducer for separating the fluctuating signals from the steady signal, a frequency counter connected to said means for obtaining a voltage proportional to the frequency of the pressure variations, an amplitude detector connected in parallel with said frequency counter for obtaining a voltage proportional to the amplitude of the pressure variations, a polarity sensitive potential comparing device connected in circuit with the outputs of said frequency counter and amplitude detector for comparing the outputs thereof, a voltage divider in said circuit, and a movable arm for said voltage divider, said arm being movable to balance the potentials applied to the comparing device.

3. Apparatus for determining the uniformity of fluidization in a chamber containing a finely divided solid and a gas passing therethrough which comprises a pressure transducer connected across the chamber for obtaining a voltage proportional to the pressure applied thereto, said transducer producing a steady signal proportional to the basic pressure of the gas and a fluctuating signal proportional to the change in pressure in said chamber, means connected to said transducer for separating the fluctuating signals from the steady signal, a frequency counter connected to said means for obtaining a voltage proportional to the frequency of the pressure variations, an amplitude detector connected in parallel with said frequency counter for obtaining a voltage proportional to the amplitude of the pressure variations, a polarity sensitive potential comparing device connected in circuit with the outputs of said frequency counter and amplitude detector for comparing the outputs thereof, a voltage divider in said circuit, a movable arm for said voltage divider, and a reversible motor controlled by said comparing device connected to change the position of said arm to balance the potentials applied to the comparing device, the position of said arm indicating the ratio between the said frequency and amplitude of the pressure variations.

References Cited in the file of this patent

UNITED STATES PATENTS

| | | |
|---|---|---|
| 2,501,377 | Cherry | Mar. 21, 1950 |
| 2,571,979 | Webster | Oct. 16, 1951 |

OTHER REFERENCES

Abstract pub. of Serial No. 708,342, vol. 638, p. 288 Official Gazette, Sept. 5, 1950.